(12) United States Patent
Tran (10) Patent No.: US 10,216,992 B2
(45) Date of Patent: Feb. 26, 2019

(54) DATA ENTRY SYSTEM WITH DRAWING RECOGNITION

(71) Applicant: Microsoft Technology Licensing, LLC, Redmond, WA (US)

(72) Inventor: To Tran, Arlöv (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 15/358,051

(22) Filed: Nov. 21, 2016

(65) Prior Publication Data

US 2018/0144189 A1    May 24, 2018

(51) Int. Cl.
*G06K 9/00* (2006.01)
*G06K 9/62* (2006.01)
*G06T 7/00* (2017.01)
*G06T 11/20* (2006.01)
*G06F 3/0488* (2013.01)

(52) U.S. Cl.
CPC ....... *G06K 9/00476* (2013.01); *G06F 3/0488* (2013.01); *G06K 9/6256* (2013.01); *G06T 7/0079* (2013.01); *G06T 11/20* (2013.01)

(58) Field of Classification Search
CPC ... G06T 7/10; G06T 7/70; G06T 11/60; G06T 11/80; G06T 2207/20012; G06T 2207/20081; G06T 2207/20092; G06T 2207/20212; G06T 2207/20221; G06K 9/00409; G06K 9/00422; G06K 9/00442; G06K 9/00456; G06K 2009/00489; G06K 2009/6213; G06K 9/72; G06K 9/726; G06F 3/048; G06F 3/0481; G06F 3/0487; G06F 3/0488
See application file for complete search history.

(56) References Cited

U.S. PATENT DOCUMENTS

| 7,298,903 | B2 | 11/2007 | Wang et al. | 382/186 |
| 7,515,752 | B2 | 4/2009 | Tremblay et al. | 382/187 |
| 7,574,048 | B2 | 8/2009 | Shilman et al. | 382/187 |
| 7,643,687 | B2 | 1/2010 | Jurion et al. | 382/229 |

(Continued)

OTHER PUBLICATIONS

Gocinski, Frank, "Tablet 101 Column 2: Adding Context Awareness to Improve Handwriting Recognition", Published on: Jul. 2004, 16 pages, Available at: https://msdn.microsoft.com/en-us/library/ms811394.aspx.

(Continued)

*Primary Examiner* — Andrew W Johns (57) ABSTRACT

An electronic device is described which has a memory storing an image for display to a user. The device has a shape recognizer which receives drawing input as a result of the user drawing at a location of the displayed image; and a semantic segmentation component which carries out image analysis of the image to compute one or more object classes of objects depicted at the location. The shape recognizer is configured to recognize the drawing input as being in a computed graphical item class of a plurality of pre-specified graphical item classes by analyzing a shape of the drawing input and by using information about the computed object classes of the one or more objects depicted at the drawing input location in the image. The processor is configured to offer at least one graphical item of the computed graphical item class for input to the electronic device.

20 Claims, 6 Drawing Sheets

(56) References Cited

U.S. PATENT DOCUMENTS

| | | |
|---|---|---|
| 7,729,538 B2 | 6/2010 | Shilman et al. ............. 382/181 |
| 8,917,957 B2 | 12/2014 | Hirota ............... G06F 17/30271 |
| 9,116,871 B2 | 8/2015 | Isabel et al. .......... G06F 17/241 |
| 9,317,937 B2 | 4/2016 | Le ........................... G06T 11/00 |
| 9,355,332 B2 | 5/2016 | Dong et al. .............. G06K 9/60 |
| 2002/0141643 A1 | 10/2002 | Jaeger .......................... 382/181 |
| 2008/0195931 A1 | 8/2008 | Raghupathy et al. ........ 715/230 |
| 2012/0054601 A1 | 3/2012 | Cohen et al. ................. 715/243 |
| 2014/0325435 A1* | 10/2014 | Jung et al. ............ G06F 3/0484 715/790 |
| 2015/0221070 A1* | 8/2015 | Winnemoeller et al. .................... G06T 5/006 382/203 |

OTHER PUBLICATIONS

Zhang, et al., "Adaptive correction of errors from recognized Chinese ink texts based on context", In Proceedings of International Conference on Information Technology and Computer Science, Jul. 25, 2009, pp. 314-320.

\* cited by examiner

DATA ENTRY SYSTEM WITH DRAWING RECOGNITION

BACKGROUND

Inputting data to computing devices is time consuming, burdensome and error prone for end users especially for small form factor computing devices such as tablet computers, smart phones, smart watches and other wearable computing devices. A user may wish to input a graphical item such as a picture, clip art, thumbnail image, emoji, emoticon, pictogram or other graphical item, but typically the user has to search for and scroll through lists of graphical items to find the one to input. Search and scrolling or selecting is time consuming and error prone especially where there are many graphical items to be considered.

In order to search for a graphical item to input, for example, when authoring content, a user may type in query terms to a search engine to obtain a ranked list of results comprising graphical items. However, the user needs to know what query terms to enter and this requires knowledge of query terms which are appropriate.

The embodiments described below are not limited to implementations which solve any or all of the disadvantages of known data entry systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An electronic device is described which has a memory storing an image for display to a user. The device has a shape recognizer which receives drawing input as a result of the user drawing at a location of the displayed image; and a semantic segmentation component which carries out image analysis of the image to compute one or more object classes of objects depicted at the location in the image. The shape recognizer is configured to recognize the drawing input as being in a computed graphical item class of a plurality of pre-specified graphical item classes by analyzing a shape of the drawing input and by using information about the computed object classes of the one or more objects depicted at the drawing input location in the image. The processor is configured to offer at least one graphical item of the computed graphical item class for input to the electronic device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Drawing is intuitive to end users and the inventor has recognized that drawing input is a simple and natural way for end users to input data to computing devices, especially in the case of small form factor computing devices. The inventor has recognized that drawing input may be interpreted in different ways depending on the context. Drawing input made on an image such as a digital photograph or digital video means different things according to the location of the drawing input on the image. By detecting the location of drawing input and using the location together with image analysis of the digital photograph or video, shape recognition of the drawing input is facilitated. The resulting shape recognition output is used to guide automatic selection of one or more candidate graphical items such as thumbnail images, emoji, pictograms, clip art, emoticons and other graphical items, for data entry. The candidate graphical item(s) are offered to an end user for adding to the image and/or replacing the drawing input.

Figure 1:
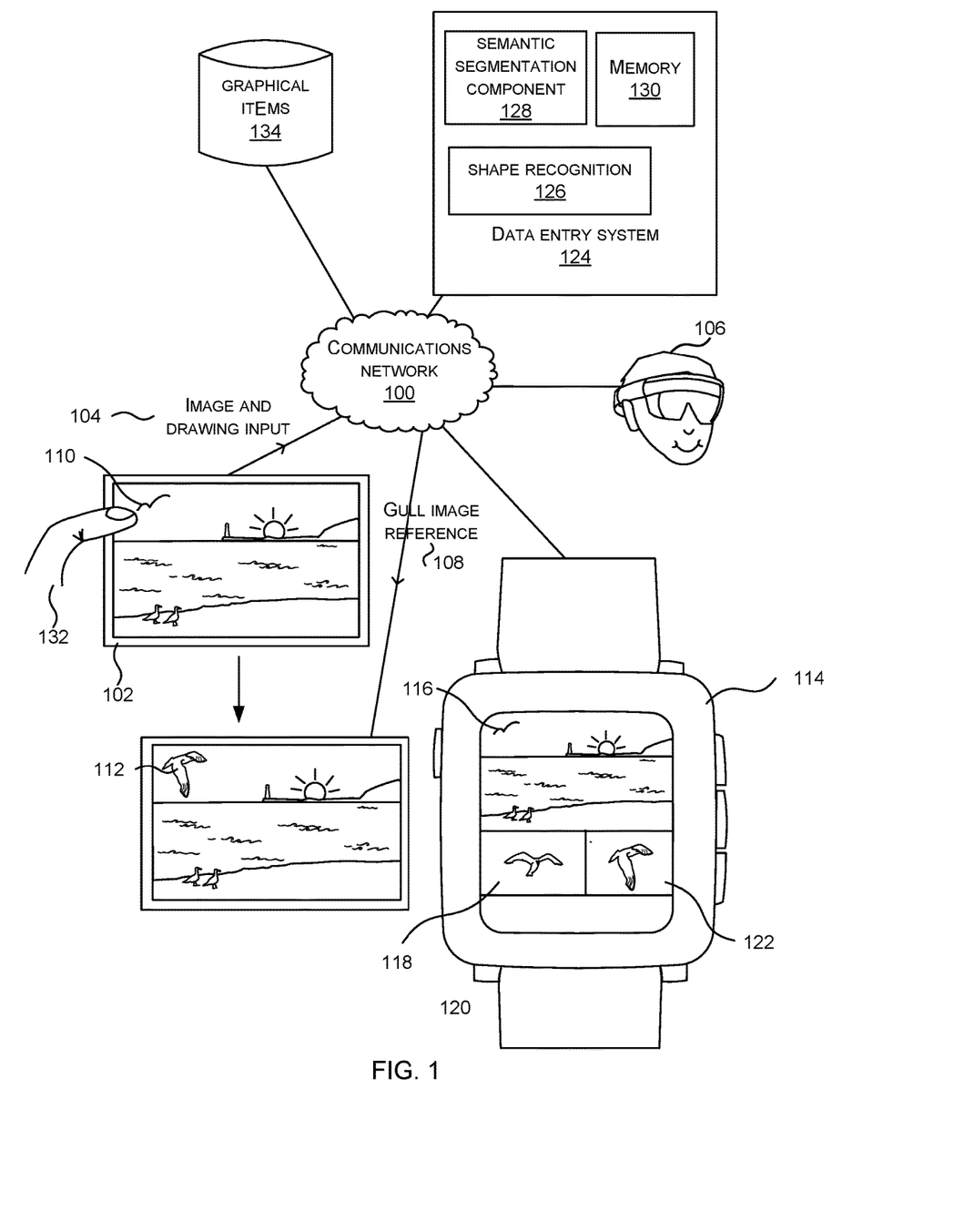
FIG. 1 is a schematic diagram of a data entry system and a plurality of electronic devices connected via a communications network.

FIG. 1 is a schematic diagram of a data entry system 124 and a plurality of electronic devices 102, 114, 106 connected via a communications network 100. The electronic devices comprise a tablet computer 102, a smart watch 114 and an augmented reality head worn computer 106 but these are examples only and other types of electronic device may be used including but not limited to desktop computers, smart phones, game consoles, or other computing devices.

The data entry system 124 is shown in FIG. 1 as being remote from the electronic devices 102, 114, 106 so that it is able to act as a cloud service to provide functionality to the electronic devices 102, 114, 106. However, this is not essential. The data entry system 124 is integral with an electronic device itself such as the tablet computer 102, smart watch 114, augmented reality computing device or other computing device. It is also possible for the functionality of the data entry system 124 to be distributed between an electronic device 102, 114, 106 and a server or other node in the communications network 100. The data entry system 124 is implemented using any one or more of: software, hardware, firmware.

FIG. 1 shows a graphical items store 134 connected to communications network 100. The graphical items store 134 is a database, list or other store of graphical items. A non-exhaustive list of types of graphical items is: thumbnail images, pictograms, emoji, emoticons, clip art, icons. The graphical items may be static or animated. The graphical items store is located at the electronic devices 102, 114, 106 in some cases. Individual ones of the graphical items in the store 134 have meta data describing what the graphical item represents or indicating a class of object that the graphical item represents.

Each of the electronic devices 102, 114, 106 is able to display an image such as a digital photograph or video. The tablet computer 102 displays a digital photograph of a sunset at the seaside at a touch screen of the tablet computer. The smart watch displays the same digital photograph of a sunset at the seaside at a touch screen of the smart watch 114. The augmented reality computing device 106 also displays the photograph of the sunset at the seaside and this display is projected into the eye of the wearer of the computing device and is not shown in FIG. 1. The images displayed by the electronic devices are obtained from any source, such as an image capture device at the electronic device itself, a store of images at the electronic device or a store of images accessed by the electronic device via communications network 100.

An end user of the electronic device makes drawing input at a location in the displayed image. The drawing input is made using any type of user input mechanism such as drawing with a finger 132 on a touch screen, drawing with a stylus on a touch screen, drawing with a mouse on a desktop computer, drawing with a joystick on a game console, drawing by finger pointing in an augmented reality scenario or others. The drawing input forms digital ink 110 in some cases where it results in a digital representation of ink formed on the display of the image.

In the case illustrated in FIG. 1 a user draws digital ink shape 110 onto a touch screen of the tablet computer 102 with his or her finger 132. The image (photograph of the seaside scene), the digital ink shape 110, and a location of the digital ink shape 110 in the image is sent to the data entry system 124 via communications network 100. The data entry system 124 computes shape recognition of the drawing input by using semantic segmentation of the image and by using the location of the digital ink shape 110 in the image. The computed shape recognition is used to select relevant graphical items 134 from the graphical items store. At least one graphical item reference, such as a reference to a gull image 108 in the scenario of FIG. 1 for the tablet computer, is sent from the data entry system 124 to the tablet computer 102. The tablet computer retrieves the gull image using the reference and replaces the digital ink shape 110 by the gull image 112. Alternatively the data entry system 124 retrieves the gull image 112 and sends that to the tablet computer. In situations where the user draws a complex digital ink shape 110 that is not recognized the digital ink shape 110 remains on the display so that the user is able to save the image with the digital ink shape 110 on it.

In the case of the smart watch 114 in FIG. 1 the user draws shape 116 onto the touch screen and this is the same shape as shape 110 drawn onto the tablet computer. The image and the drawing input is sent to the data entry system 124 and stored in memory 130. The data entry system carries out semantic segmentation of the digital photograph using a semantic segmentation component 128. A shape recognizer 126 recognizes a shape of the drawing input using the results from the semantic segmentation component and using the location of the drawing input in the image. The shape recognition results are sent to the smart watch 114 which uses the shape recognition results to retrieve a plurality of candidate graphical items from any one or more of: graphical item store 134, a memory at the smart watch 114, an information retrieval system connected to communications network 100, another electronic device 102, 106, or another source in communication with the smart watch 114. The candidate graphical items are displayed alongside or over the image. In the example of FIG. 1 there are two candidate graphical items 118, 122 and these are two different images of flying sea birds. The user is able to select one of the graphical items 118, 122 by touching the touch screen of the smart watch and the selected graphical item is used to replace the drawing input.

Alternatively, or in addition, the functionality of the data entry system described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
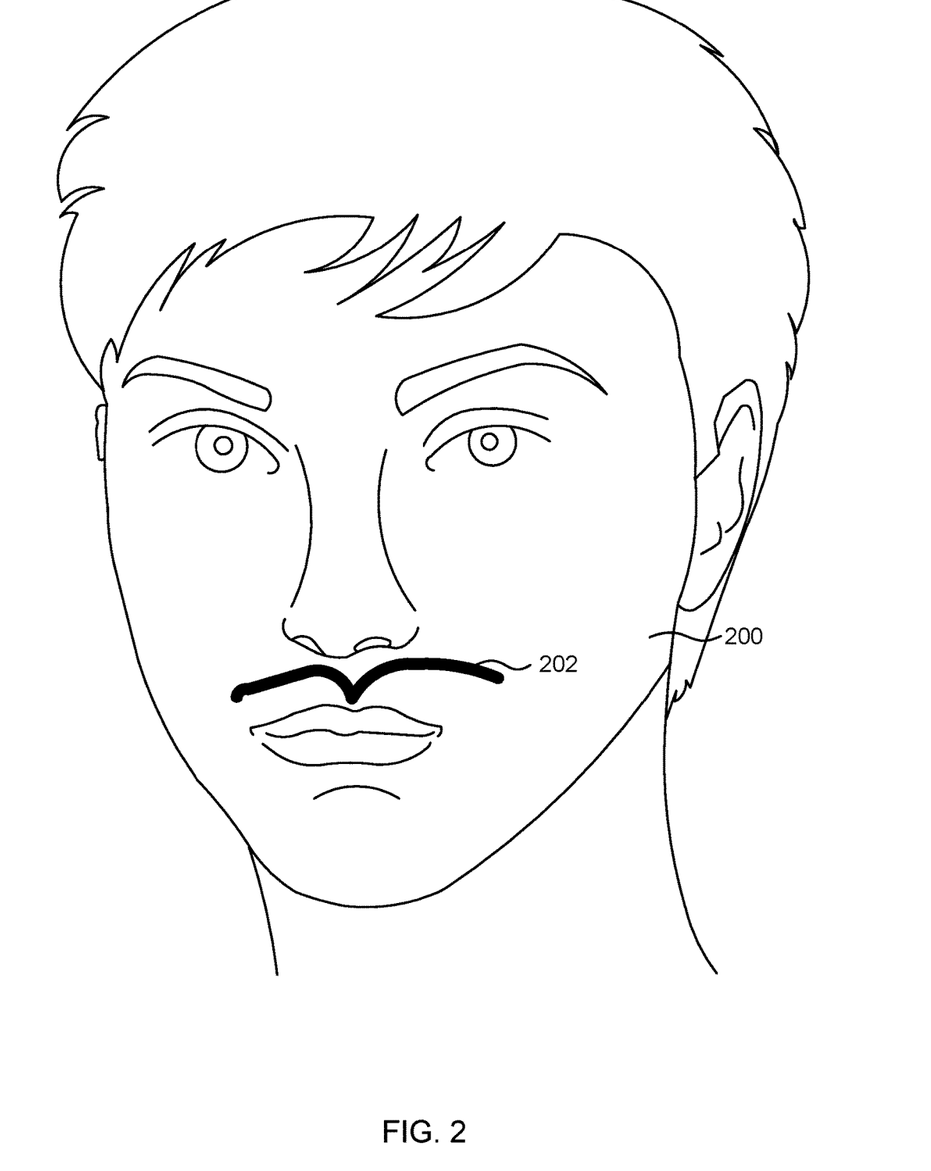
FIG. 2 is a schematic diagram of an image with drawing input made by a user.

FIG. 2 is a schematic diagram of an image of a man's face 200 displayed by an electronic device such as any of the electronic devices of FIG. 1. A user has made drawing input 202 on the image and the drawing input has a shape which is almost identical to the shape of the drawing input on the tablet computer 102 and smart watch 114 of FIG. 1. The data entry system 124 is able to recognize the drawing input 202 as representing a moustache rather than a flying sea bird as a result of the use of the semantic image segmentation and the location of the drawing input in the image.

Figure 3:
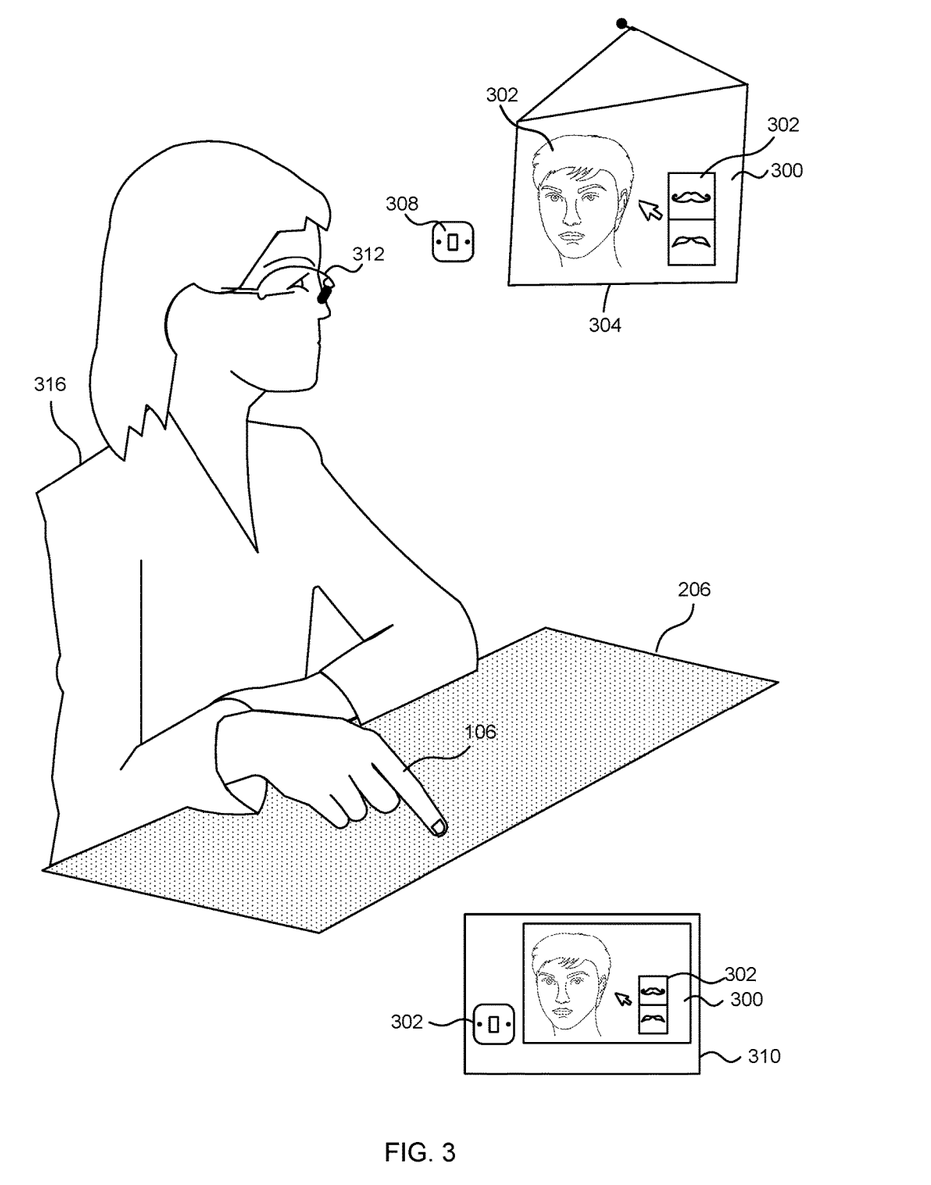
FIG. 3 is a schematic diagram of a user making drawing input on an image using an augmented reality computing device.

FIG. 3 is a schematic diagram of a user 316 making drawing input with her hand 314 on an image using an augmented reality computing device 312. User 316 operates a user interface at a distance by using her hand 314 to point as a relative pointing device. The user's is wearing augmented reality computing device 312 which enables the user to see graphical elements 302, 304 of the user interface overlaid on a real notice board 300 in her kitchen. One of the graphical elements 304 is a cursor which the user is moving using her finger 314 as a relative pointing device.

A capture device in the augmented reality glasses 312 captures sensor data such as images depicting the user's hand 306 and its environment which includes a kitchen table 306. The sensor data is processed by a tracker which tracks the position of the kitchen table and also tracks the pose parameters of the hand 306. Using the tracked data a processor computes relative pointing data (of the hand relative to the table) and uses that to control the location of the cursor 304. In this example the user is not touching the kitchen table 306. However, it is also possible for the user to touch the kitchen table so as to receive haptic feedback about her finger movements. In this example the user is pointing with a single finger. However, it is also possible for the user to make movements with two or more digits of her hand (as if she were operating a multi-touch sensitive screen). The pose parameters include position and orientation of the digits and this is used to control the augmented reality interface, in a similar manner as for a multi-touch sensitive screen but using a relative rather than an absolute mapping between the pose parameters and the control of the augmented reality display.

The augmented reality computing device 312 projects an image 302 of a man's face into the user's eyes such that the image appears to be on the real notice board 300. The user operates the cursor 304 using her finger 314 to draw drawing user input onto the image. The data entry system computes candidate graphical items and these are shown on the augmented reality display at 302. The user is able to select one of the candidate graphical items using her finger 314.

The lower part of FIG. 3 shows a view from one eye of the user. It includes a light switch 308 which is in the real kitchen, and the real kitchen notice board 300. The view also includes virtual reality graphical items 302 and 304.

Figure 4:
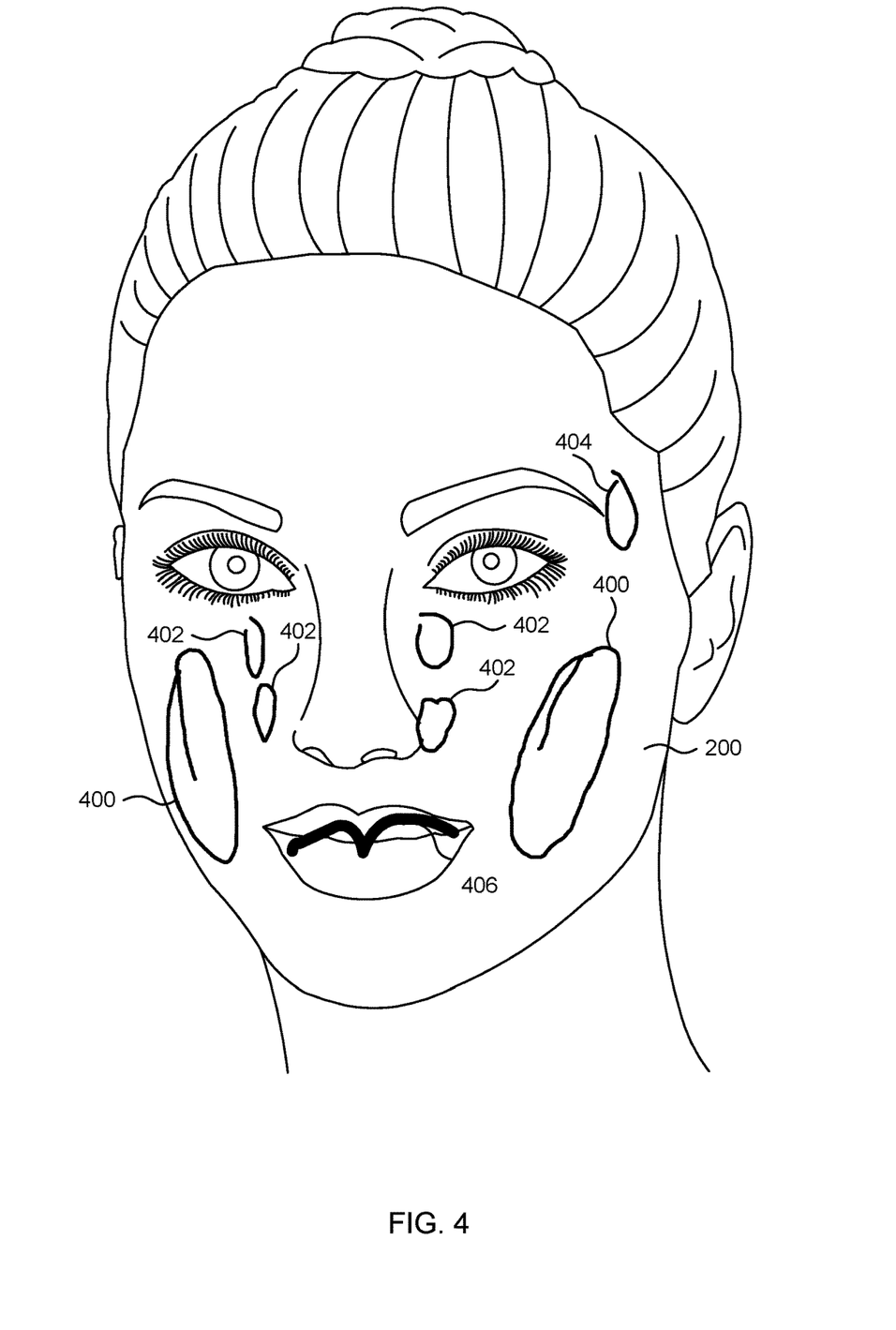
FIG. 4 is a schematic diagram of an image with drawing input made by a user at several locations.

FIG. 4 is a schematic diagram of an image of a woman's face 200 displayed by an electronic device such as any of the electronic devices of FIG. 1. A user has made drawing input 400, 402, 404, 406 on the image and the drawing input comprises oval shapes 400, 402, 404 and wavy line 406. The data entry system 124 is able to recognize the oval shapes as representing different objects depending on the location of the drawing input on the image. Oval shape 404 on the woman's temple represents is recognized as representing perspiration. Oval shape 402 below the woman's eye is recognized as representing a tear. Oval shape 400 on the woman's cheek is recognized as representing a blush region. The ability to take the location of the drawing input into account during the shape recognition is achieved by adapting the shape recognizer 126 so that it receives location data as part of its input, together with the image and the semantic segmentation results, and takes that into account during the shape recognition process. The data entry system 124 is able to recognize the wavy line 406 as color to be applied to lips of the woman's face and uses the color of wavy line 406 to fill the lips of the woman with that color.

Figure 5:
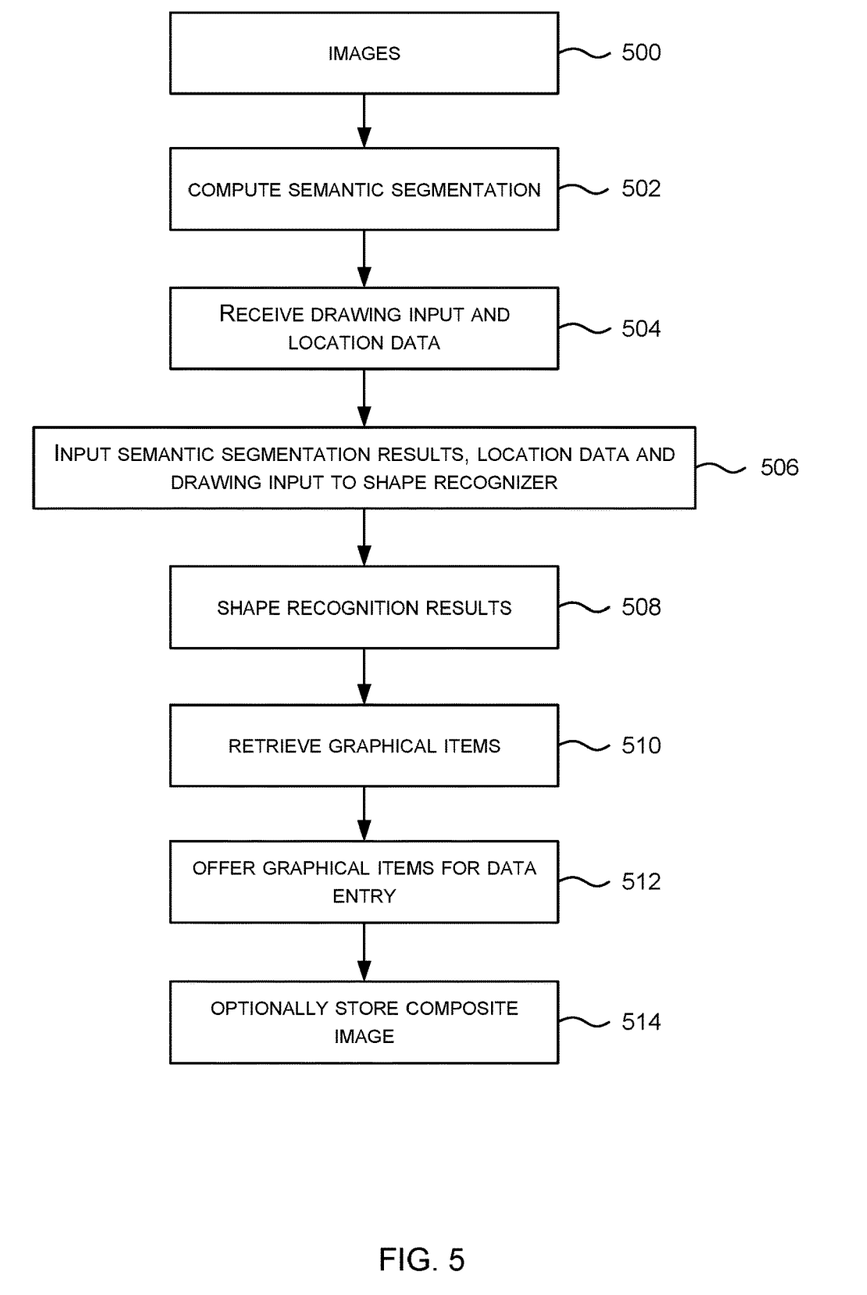
FIG. 5 is a flow diagram of a method of operation at a data entry system.

FIG. 5 is a flow diagram of a process at the data entry system 124. An image is received 500 and a semantic segmentation is computed 502. More detail about the semantic segmentation process is given later in this document. The semantic segmentation produces a label for each pixel of the image where the label indicates which class of object the pixel depicts, from a plurality of available object classes. A non-exhaustive list of object classes is sky, face, person, water, eye, temple, cheek.

The data entry system 124 receives 504 the drawing input and location data. For example, the location data is a bounding box of the drawing input computed around the drawing input in the image or coordinates of the drawing input in the image. The semantic segmentation results, location data and drawing input are fed 506 to a shape recognizer. The shape recognizer is a trained machine learning system which has been trained using pairs of training data. Each pair comprises: (semantic segmentation data, location data, drawing input) and a shape of a known class from a plurality of specified classes of shape. The training data is obtained by obtaining images with drawing input on them, and manually labeling the classes of the drawing shapes. A machine learning system such as a neural network, random decision forest, support vector machine or other machine learning system is trained using the labeled training data using update rules that update the machine learning system in the light of the training examples.

Shape recognition results 508 are output by the shape recognizer and comprise one or more candidate shape classes and scores or probabilities associated with the candidates. If the shape recognition results 508 comprise at least one shape recognized with a confidence over a specified threshold, then the data entry system retrieves 510 one or more graphical items which are members of the candidate shape classes and ranks the graphical items using the scores of probabilities of the candidates. If the shape recognition results are poor (i.e. no shape is found) then the process of FIG. 5 ends.

One of more of the candidate graphical items are offered 512 to the user for data entry. If the user selects a candidate graphical item it is aggregated into the image, for example, by replacing the drawing input in a manner which blends the graphical item into the image appropriately. For example, a color balance of the candidate graphical item is adjusted to match a color balance of the image. For example, the graphical item is scaled and/or rotated to appropriately replace the drawing input. Any composite image formed from the candidate graphical item and the image is optionally stored 514.

The process of FIG. 5 repeats for additional drawing input made at the same image as in the situation of FIG. 4.

More detail about an example semantic segmentation component 128 is now given. Any suitable type of semantic segmentation component can be used which has the ability to segment an image and identify appropriate object classes for segmented regions of the image. At least a plurality of possible object classes is used to label the segmented image regions and in a preferred example, around 20 object classes are used although it is possible to increase the scale of the system and use much higher numbers of object classes. Examples of object classes comprise sky, grass, person, building, horse, plane, cow, sheep, water, boat, tree, road and flower. In some embodiments the semantic segmentation system is preferably also able to provide depth ordering information for the identified objects although this is not essential. Also, the semantic segmentation system is preferably, but not essentially, able to identify particular instances of objects (e.g. recognize an image of a person as being of a particular named individual) and to identify information about the object such as its orientation, object attributes, presence and position of object parts (e.g. person's face, leaves of a tree, roof of a building). The semantic segmentation system may optionally comprise semantic information associated with the object classes such as information about the relative sizes of objects of class person and building or information about the general position of objects such as sky in images. The semantic segmentation system uses a trained multi-layered neural network in some examples. The neural network is trained using training data comprising labeled images where the pixels of the images are labeled as depicting one of the available object classes. However, it is not essential to use neural network technology. Other types of trained classifier may be used such as random decision forests and support vector machines.

Figure 6:
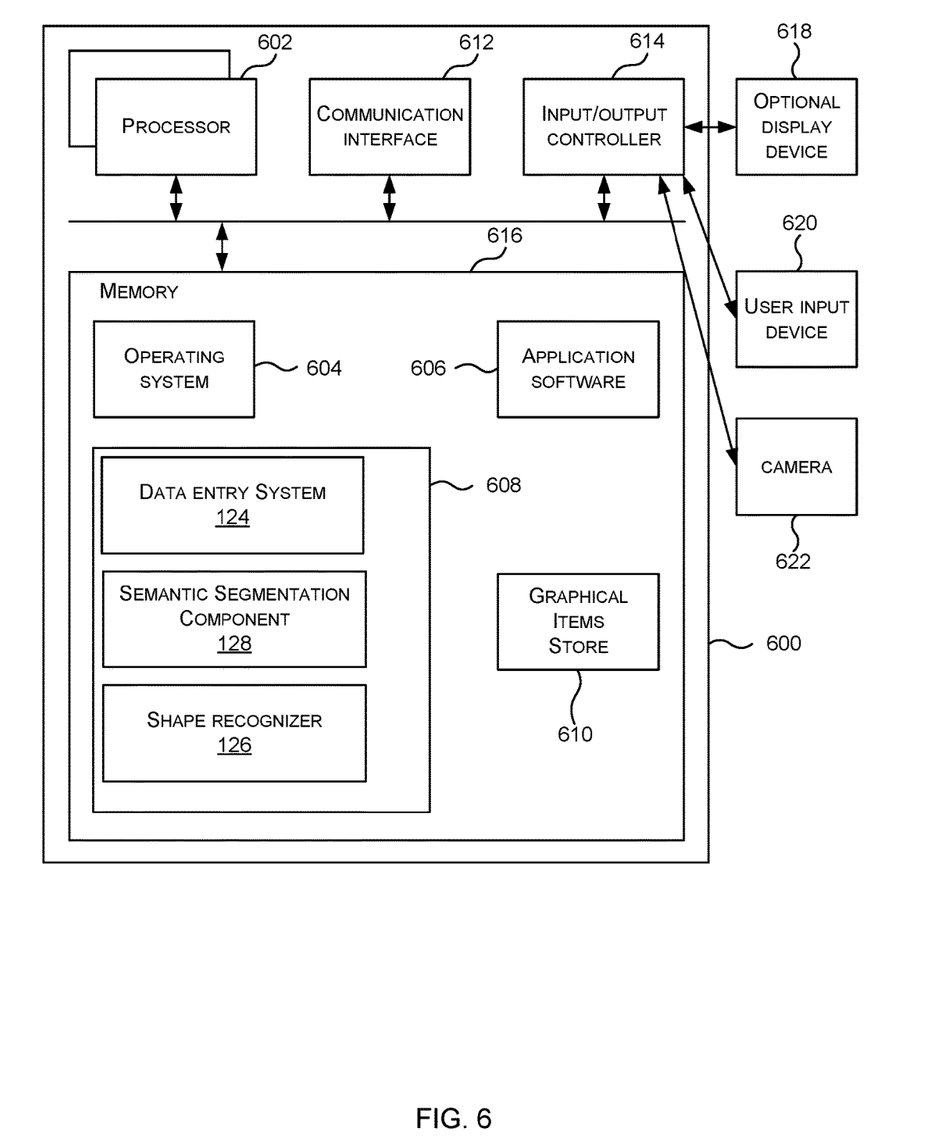
FIG. 6 illustrates an exemplary computing-based device in which embodiments of a data entry system are implemented.

FIG. 6 illustrates various components of an exemplary computing-based device 600 which are implemented as any form of a computing and/or electronic device, and in which embodiments of a data entry system using drawing input are implemented in some examples.

Computing-based device 600 comprises one or more processors 602 which are microprocessors, controllers or any other suitable type of processors for processing computer executable instructions to control the operation of the device in order to recognize the shape of drawing input on images such as digital photographs and videos. In some examples, for example where a system on a chip architecture is used, the processors 602 include one or more fixed function blocks (also referred to as accelerators) which implement a part of the method of FIG. 5 in hardware (rather than software or firmware). Platform software comprising an operating system 604 or any other suitable platform software is provided at the computing-based device to enable application software 606 to be executed on the device. The application software comprises digital image editing software, video editing software or other content authoring software in some cases. The operating system 604 is able to provide information about user drawing input events, such as coordinates of the drawing input, to a data entry system 124. The data entry system 124 comprises a semantic segmentation component 128 as described herein and a shape recognizer 126 as described above. A graphical items store 610 stores graphical items at the computing-based device 600 and images and/or videos. In some cases the images and/or videos are captured using a camera 622 connected to the computing-based device 600 or integral with the computing-based device.

The computer executable instructions are provided using any computer-readable media that is accessible by computing based device 600. Computer-readable media includes, for example, computer storage media such as memory 616 and communications media. Computer storage media, such as memory 616, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 616) is shown within the computing-based device 600 it will be appreciated that the storage is, in some examples, distributed or located remotely and accessed via a network or other communication link (e.g. using communication interface 612 which is a transceiver, a network card or other communications interface).

The computing-based device 600 also comprises an input/output controller 614 arranged to output display information to a display device 618 which may be separate from or integral to the computing-based device 600. The display device is a touch screen in some cases or a projector in an augmented reality computing device although other types of display device are used in some cases. The display information may provide a graphical user interface for display of images and to allow drawing user input. The input/output controller 614 is also arranged to receive and process input from one or more devices, such as a user input device 620 (e.g. a mouse, keyboard, camera, microphone, joystick, stylus or other input device). In some examples the user input device 620 detects voice input, user gestures or other user actions and provides a natural user interface (NUI). This user input may be used to make drawing input on images, control display of images, select candidate graphical items and for other purposes. In an embodiment the display device 618 also acts as the user input device 620 if it is a touch sensitive display device. The input/output controller 614 outputs data to devices other than the display device in some examples, e.g. a locally connected printing device.

Any of the input/output controller 614, display device 618 and the user input device 620 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following An electronic device comprising:

a memory storing an image for display to a user;

a shape recognizer which receives drawing input as a result of the user drawing at a location of the displayed image;

a semantic segmentation component configured to carry out image analysis of the image to compute one or more object classes of objects depicted at the location in the image; and wherein the shape recognizer is configured to recognize the drawing input as being in a computed graphical item class of a plurality of pre-specified graphical item classes by analyzing a shape of the drawing input and by using information about the computed object classes of the one or more objects depicted at the drawing input location in the image; and where the processor is configured to offer/present at least one graphical item of the computed graphical item class for input to the electronic device.

The electronic device described above wherein the location in the image comprises a bounding box computed to bound the drawing input.

The electronic device described above wherein the location in the image comprises coordinates of the drawing input in the image.

The electronic device described above wherein the processor is configured such that, when user input is received selecting the offered graphical item, the offered graphical item is inserted into the image at the location.

The electronic device described above wherein the processor is configured such that, when user input is received selecting the offered graphical item, the offered graphical item is inserted into the image at the location so as to replace the drawing input.

The electronic device described above wherein the processor is configured to retrieve the at least one graphical item of the computed graphical item class by sending an information retrieval request to a graphical item store.

The electronic device described above wherein the semantic segmentation component is a trained machine learning system selected from one or more of: a random decision forest, a neural network, a support vector machine.

The electronic device described above wherein the shape recognition component is a trained machine learning system selected from one or more of: a random decision forest, a neural network, a support vector machine.

The electronic device described above wherein the shape recognition component has been trained using training data comprising pairs, each pair comprising: semantic segmentation data, location data, drawing input and a shape of a known class from a plurality of specified classes of shape.

The electronic device described above wherein the image is a digital photograph or video.

The electronic device of described above being a wearable computer.

The electronic device of described above being a hand held computing device.

A computer-implemented method of data entry comprising:

storing at a memory an image for display to a user;

receiving drawing input as a result of the user drawing at a location of the displayed image;

computing image analysis of the image to compute one or more object classes of objects depicted at the location in the image;

recognizing the drawing input as being in a computed graphical item class of a plurality of pre-specified graphical item classes by analyzing a shape of the drawing input and by using information about the computed object classes of the one or more objects depicted at the drawing input location in the image; and offering/presenting at least one graphical item of the computed graphical item class for input to the electronic device.

The method described above comprising computing a bounding box of the drawing input as the location in the image.

The method described above comprising obtaining coordinates of the drawing input in the image as the location.

The method described above comprising replacing the drawing input on the image by the offered at least one graphical item in response to user input selecting the at least one graphical item.

The method described above comprising adjusting a color balance of the graphical item to match a color balance of the image before the replacing of the drawing input.

The method described above comprising retrieve the at least one graphical item of the computed graphical item class by sending an information retrieval request to a graphical item store.

The method described above comprising recognizing the drawing input using a shape recognizer comprising a machine learning component, and training the shape recognizer using pairs of data, each pair comprising semantic segmentation data, location data, drawing input and a shape of a known class from a plurality of specified classes of shape.

One or more tangible device-readable media with device-executable instructions that, when executed by a computing system, direct the computing system to perform operations comprising:

storing at a memory a video for display to a user;

receiving drawing input as a result of the user drawing at a location of the displayed video;

computing image analysis of the video to compute one or more object classes of objects depicted at the location in the video;

recognizing the drawing input as being in a computed graphical item class of a plurality of pre-specified graphical item classes by analyzing a shape of the drawing input and by using information about the computed object classes of the one or more objects depicted at the drawing input location in the video; and offering/presenting at least one graphical item of the computed graphical item class for input to the electronic device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An electronic device comprising:
a memory storing an image for display to a user;
a shape recognition component which receives drawing input as a result of the user drawing at a location of the displayed image;
a semantic segmentation component configured to carry out image analysis of the image to compute one or more object classes of objects depicted at the location in the image; and wherein
the shape recognition component is configured to recognize the drawing input as being in a computed graphical item class of a plurality of pre-specified graphical item classes by analyzing a shape of the drawing input and by using information about the computed object classes of the one or more objects depicted at the drawing input location in the image; and
a processor configured to offer at least one graphical item of the computed graphical item class for input to the electronic device.

2. The electronic device of claim 1 wherein the location in the image comprises a bounding box computed to bound the drawing input.

3. The electronic device of claim 1 wherein the location in the image comprises coordinates of the drawing input in the image.

4. The electronic device of claim 1 wherein the processor is configured such that, when user input is received selecting the offered graphical item, the offered graphical item is inserted into the image at the location.

5. The electronic device of claim 1 wherein the processor is configured such that, when user input is received selecting the offered graphical item, the offered graphical item is inserted into the image at the location so as to replace the drawing input.

6. The electronic device of claim 1 wherein the processor is configured to retrieve the at least one graphical item of the computed graphical item class by sending an information retrieval request to a graphical item store.

7. The electronic device of claim 1 wherein the semantic segmentation component is a trained machine learning system selected from one or more of: a random decision forest, a neural network, a support vector machine.

8. The electronic device of claim 1 wherein the shape recognition component is a trained machine learning system selected from one or more of: a random decision forest, a neural network, a support vector machine.

9. The electronic device of claim 8 wherein the shape recognition component has been trained using training data comprising pairs, each pair comprising: semantic segmentation data, location data, drawing input and a shape of a known class from a plurality of specified classes of shape.

10. The electronic device of claim 1 wherein the image is a digital photograph or video.

11. The electronic device of claim 1 being a wearable computer.

12. The electronic device of claim 1 being a hand held computing device.

13. A computer-implemented method of data entry comprising:
storing at a memory an image for display to a user;
receiving drawing input as a result of the user drawing at a location of the displayed image;
computing image analysis of the image to compute one or more object classes of objects depicted at the location in the image;
recognizing the drawing input as being in a computed graphical item class of a plurality of pre-specified graphical item classes by analyzing a shape of the drawing input and by using information about the computed object classes of the one or more objects depicted at the drawing input location in the image; and
offering at least one graphical item of the computed graphical item class for input to the electronic device.

14. The method of claim 13 comprising computing a bounding box of the drawing input as the location in the image.

15. The method of claim 13 comprising obtaining coordinates of the drawing input in the image as the location.

16. The method of claim 13 comprising replacing the drawing input on the image by the offered at least one graphical item in response to user input selecting the at least one graphical item.

17. The method of claim 16 comprising adjusting a color balance of the graphical item to match a color balance of the image before the replacing of the drawing input.

18. The method of claim 13 comprising retrieve the at least one graphical item of the computed graphical item class by sending an information retrieval request to a graphical item store.

19. The method of claim 13 comprising recognizing the drawing input using a shape recognizer comprising a machine learning component, and training the shape recognizer using pairs of data, each pair comprising semantic segmentation data, location data, drawing input and a shape of a known class from a plurality of specified classes of shape.

20. One or more computer storage media with device-executable instructions that, when executed by a computing system, direct the computing system to perform operations comprising:
storing at a memory a video for display to a user;
receiving drawing input as a result of the user drawing at a location of the displayed video;
computing image analysis of the video to compute one or more object classes of objects depicted at the location in the video;

recognizing the drawing input as being in a computed graphical item class of a plurality of pre-specified graphical item classes by analyzing a shape of the drawing input and by using information about the computed object classes of the one or more objects depicted at the drawing input location in the video; and offering at least one graphical item of the computed graphical item class for input to the electronic device.

\* \* \* \* \*